(12) United States Patent
Roberts

(10) Patent No.: US 12,561,077 B2
(45) Date of Patent: Feb. 24, 2026

(54) MULTI-FORMAT DATA OBJECTS IN MEMORY

(71) Applicant: Micron Technology, Inc., Boise, ID (US)

(72) Inventor: David Andrew Roberts, Wellesley, MA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/774,054

(22) Filed: Jul. 16, 2024

(65) Prior Publication Data

US 2025/0060888 A1      Feb. 20, 2025

Related U.S. Application Data

(60) Provisional application No. 63/533,462, filed on Aug. 18, 2023.

(51) Int. Cl.
G06F 3/06 (2006.01)

(52) U.S. Cl.
CPC .......... G06F 3/0631 (2013.01); G06F 3/0604 (2013.01); G06F 3/0679 (2013.01)

(58) Field of Classification Search
None
See application file for complete search history.

(56) References Cited

U.S. PATENT DOCUMENTS

| | | | | |
|---|---|---|---|---|
| 11,375,050 | B1 * | 6/2022 | Mittal | H04L 69/08 |
| 11,477,306 | B2 * | 10/2022 | Lu | H04L 69/04 |
| 12,004,006 | B2 * | 6/2024 | Arrobo Vidal | H04L 67/63 |
| 2021/0194724 | A1 * | 6/2021 | Lee | H04J 14/0283 |
| 2023/0222062 | A1 * | 7/2023 | Ji | G06F 12/0871 |
| | | | | 711/141 |
| 2023/0359379 | A1 * | 11/2023 | Lee | G06F 3/061 |

* cited by examiner

*Primary Examiner* — Baboucarr Faal
(74) *Attorney, Agent, or Firm* — Schwegman Lundberg & Woessner, P.A.

(57) ABSTRACT

To implement a multi-format data object in memory, a device can receive an allocation request for a data object that includes a set of data elements. This allocation request includes respective details for a set of formats for the data object, such as details for a first format in the set of formats including. The details can include memory address information and a mapping between a first data element of the data object in the first format to a second data element in a second format in the set of formats. The details can also include identification of a conversion function configured to convert the first data element to the second data element. The device can provide access to the second format of the data object from the first format of the data object in the memory based on the mapping data structure or the conversion data structure.

20 Claims, 8 Drawing Sheets

700

705 — RECEIVE OBJECT ALLOCATION REQUEST

710 — ALLOCATE STORAGE SPACE BASED ON BASE ADDRESS AND SIZE IN ALLOCATION REQUEST

715 — STORE MAP BETWEEN FORMAT VERSION ELEMENTS

720 — STORE CONVERSION BETWEEN FORMAT VERSIONS

725 — PROVIDE TRANSLATION BETWEEN FORMAT VERSIONS FOR OBJECT ACCESS

MULTI-FORMAT DATA OBJECTS IN MEMORY

PRIORITY APPLICATION

This application claims the benefit of priority to U.S. Provisional Application Ser. No. 63/533,462, filed Aug. 18, 2023, which is incorporated herein by reference in its entirety.

TECHNICAL FIELD

Embodiments described herein generally relate to computer memory and more specifically to multi-format data objects in memory.

BACKGROUND

Memory devices for computers or other electronic devices can be categorized as volatile and non-volatile memory. Volatile memory uses power to maintain its data (e.g., is periodically refreshed), and includes random-access memory (RAM), dynamic random-access memory (DRAM), or synchronous dynamic random-access memory (SDRAM), among others. Non-volatile memory generally retains stored data in the absence of a power source, and includes flash memory, read-only memory (ROM), electrically erasable programmable ROM (EEPROM), static RAM (SRAM), erasable programmable ROM (EPROM), resistance variable memory, phase-change memory, storage class memory, resistive random-access memory (RRAM), and magnetoresistive random-access memory (MRAM), among others. Persistent memory is an architectural property of the system where the data stored in the media is available after system reset or power-cycling. In an example, non-volatile memory media can be used to build a system with a persistent memory model.

Memory devices can be coupled to a host (e.g., a host computing device) to store data, commands, or instructions for use by the host while the computer or electronic system is operating. For example, data, commands, or instructions can be transferred between the host and the memory device during operation of a computing or other electronic system.

Various protocols or standards can be applied to facilitate communication between a host and one or more other devices such as memory buffers, accelerators, or other input/output devices. In an example, an unordered protocol, such as Compute Express Link (CXL), can be used to provide high-bandwidth and low-latency connectivity.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
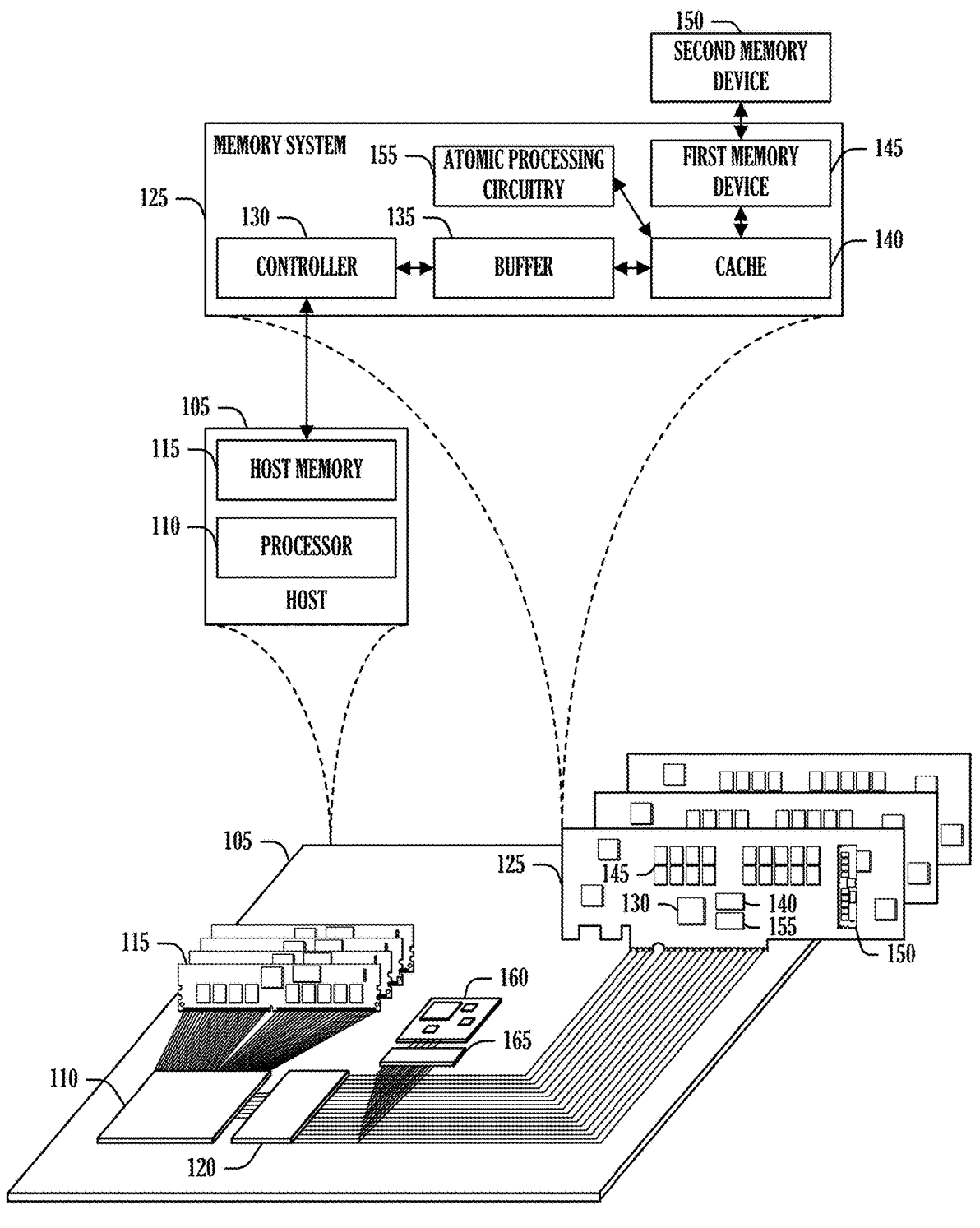
FIG. 1 is a block diagram of an example of an environment including a system for multi-format data objects in memory, according to an embodiment.

Compute Express Link (CXL) is an open standard interconnect configured for high-bandwidth, low-latency connectivity between host devices and other devices such as accelerators, memory buffers, or smart input-output (I/O) devices. CXL was designed to facilitate high-performance computational workloads by supporting heterogeneous processing and memory systems. CXL provides memory semantics and mechanisms for cache coherency on top of PCI Express (PCIe)-based I/O semantics for optimized performance.

System configurations that integrate several different devices via an interconnect like CXL can provide efficient processing of workloads at several connected entities. Often, data can be held in interconnect attached memory and shared amongst the processing elements, such as processors, graphics processors, accelerators, etc. However, there can be use-cases in which the same data is used in different formats at different times. With large, scalable shared memory subsystems, the available internal device memory bandwidth can significantly exceed memory-to-processor (e.g., host) bandwidth. When a memory system has processing capabilities, the internal device bandwidth of the memory system can be exploited to reduce memory-to-processor bandwidth by maintaining multiple formats (e.g., versions, types, etc.) of the data. The production of the various formats can be on-demand (e.g., processed when read by a host) or pre-generated (e.g., generated and stored in memory to be read by the host later).

When maintaining multiple formats of the data or storing a single format but receiving and responding to requests in a different format, there can be difficulty in maintaining consistency between the formats. This issue can be addressed by the provision of mapping or conversion functions to the memory system at the time of object allocation in the memory system. Here, allocation sets aside the space in memory for the object, yet the object need not yet be created.

When an object is allocated in the memory system, the requestor specifies a mapping between elements of the object. Consider a data object that is a block of data allocated by a user program and made up of data elements. The data elements are each a single unit of data within an Object, such as an integer, a database record, a node in a graph, or an element of a matrix, among others. The mapping provides a correlation between data element A in format Z to data element M in format Y. For example, if the data object is a list of names, and the first format is alphabetized by first name in ascending order and by last name in descending order, and there was a name A A, then the mapping would enable a reader to transition from the data element at index zero of the format Z data structure to the last data element in the format Y data structure. In this manner, any change to one data element in a first data structure can be promulgated to the corresponding data elements in the other format data structures for the same data.

The allocation can also include a conversion function. The conversion function operates similarly to the mapping—and, in an example, can use the mapping to accomplish the mapping aspect of conversion—with respect to data element correspondence between formats of the same data. However, the conversion function also modifies the contents of the data element from a source format into the data element in a destination format. These features enable the memory system to maintain consistency of multiple formats of data objects, and expose these multiple formats to applications (e.g., the processing circuitry running software) when requested.

These techniques can be useful in several scenarios that arise in modern computing. For example, multi-format data objects in memory can enable data compression, conversion between compressed sparse matrix formats, data replication, data precision adjustment, normalization, or and other pre-processing (e.g., for deep neural networks), application Error Correcting Codes (ECC), encryption, or maintaining pseudo-random number distributions, among other things. This can be accomplished by exploiting the processing capabilities on the memory system—including the generally high internal bandwidth of the memory system—to do background processing of differently formatted data while requestors (e.g., hosts) work on something else. When the host needs a specific format of the data, the host can read the data in the second format from the memory system. The memory system then either serves up a pre-processed version of the requested format or the memory system processes the data object in a first format to match the second format before delivering the data object to the host in the requested format. Thus, multi-format data objects in memory can increase system performance by running data conversion and maintenance in parallel with other processors in a system. This improves energy efficiency by computing the conversions close to data (e.g., near-memory compute) and can be applied to a wide range of data types and applications. Additional details and examples are described below.

FIG. 1 illustrates an example of an environment including a system 105 for hybrid coherency, according to an embodiment. The system 105 includes a first host 110 (e.g., central processing unit (CPU)) and a second host 160 (e.g., an accelerator), and a memory system 125. The first host 110 may have directly attached host memory 115 in the system 105. In an example, the system 105 is, or is part of, a server computer, workstation, personal laptop computer, a desktop computer, a digital camera, a smart phone, a memory card reader, Internet-of-thing enabled device, or the like. The first host 110 or the second host 160 can include one or more processor cores, a system of parallel processors, or other CPU arrangements.

The memory system 125 includes a controller 130, a buffer 135 (e.g., internal state memory), a cache 140, and a first memory device 145. The first memory device 145 can include, for example, one or more memory modules (e.g., single in-line memory modules, dual in-line memory modules, etc.). The first memory device 145 can include volatile memory or non-volatile memory. The first memory device 145 can include a multiple-chip device that comprises one or multiple different memory types or modules. In an example, the system 105 includes a second memory device 150 that interfaces with the memory system 125 and the first host 110.

The system 105 can include a backplane and can include a number of processing resources (e.g., one or more processors, microprocessors, or some other type of controlling circuitry) including, or in addition to, the first host 110 and the second host 160. The system 105 can optionally include separate integrated circuits for the first host 110, the second host 160, the memory system 125, the controller 130, the buffer 135, the cache 140, the first memory device 145, the second memory device 150, any one or more of which can comprise respective chiplets that can be connected and used together. In an example, the system 105 includes a server system or a high-performance computing (HPC) system or a portion thereof. Embodiments of the first host 110, or other components of the system 105, can be implemented in Von Neumann or in non-Von Neumann architectures, which can include one or more components (e.g., CPU, ALU, etc.) often associated with a Von Neumann architecture, or can omit these components.

In an example, the first memory device 145 can provide a main memory for the system 105, or the first memory device 145 can comprise accessory memory or storage for use by the system 105. In an example, the first memory device 145 or the second memory device 150 includes one or more arrays of memory cells, e.g., volatile or non-volatile memory cells. The arrays can be flash arrays with a NAND architecture, for example. Embodiments are not limited to a particular type of memory device. For instance, memory devices can include RAM, ROM, DRAM, SDRAM, PCRAM, RRAM, and flash memory, among others.

In embodiments in which the first memory device 145 includes persistent or non-volatile memory, the first memory device 145 can include a flash memory device such as a NAND or NOR flash memory device. The first memory device 145 can include other non-volatile memory devices such as non-volatile random-access memory devices (e.g., NVRAM, RcRAM, FeRAM, MRAM, PCM). Some memory devices—such as a ferroelectric RAM (FeRAM) device that includes ferroelectric capacitors—can exhibit hysteresis characteristics, such as a 3-D Crosspoint (3D XP) memory device, or combinations thereof.

In an example, the interface 120, or the interface 165, can include any type of communication path, bus, interconnect, or the like, that enables information to be transferred between the first host 110 or the second host 160 respectively, or other devices of the system 105, and the memory system 125. Non-limiting examples of interfaces can include a peripheral component interconnect (PCI) interface, a peripheral component interconnect express (PCIe) interface, a serial advanced technology attachment (SATA) interface, a Universal Serial Bus (USB) interface, a Thunderbolt interface, or a miniature serial advanced technology attachment (mSATA) interface, among others. In an example, the interface 120 includes a PCIe 5.0 interface that is compliant with the compute express link (CXL) protocol standard. Accordingly, in some embodiments, the interface 120 supports transfer speeds of at least 32 GT/s.

CXL is a high-speed central processing unit (CPU)-to-device and CPU-to-memory interconnect designed to enhance compute performance. CXL maintains memory coherency between the CPU memory space (e.g., the host memory 115 or caches maintained by the first host 110) and memory on attached devices or accelerators (e.g., the first memory device 145 or the second memory device 150). This arrangement enables resource sharing at higher performance, reduced software stack complexity, and lower overall system cost than other interconnect arrangements. CXL is an industry open standard interface for high-speed communications to accelerators that are increasingly used to complement CPUs in support of emerging data-rich and compute-intensive applications such as artificial intelligence and machine learning. The memory system 125 is illustrated with atomic processing circuitry 155 as an accelerator in order to perform near-memory operations. In general, the atomic memory operations (AMOs) performed by the atomic processing circuitry 155 include such small operations as incrementing a number at a memory address or multiply number in two memory addresses, etc. While AMOs are generally used for such operations, the manipulation of memory is not so restricted. For example, modern artificial neural network architectures generally involve the application of small additive or multiplicative operations or thresholding across vast swaths of artificial neurons. Because the computations are usually simple, but the data large, near memory execution of such operations is possible and beneficial given the illustrated architecture.

In an example, the controller 130 comprises a media controller such as a non-volatile memory express (NVMe) controller. The controller 130 can be configured to perform operations such as copy, write, read, error correct, etc. for the first memory device 145. In an example, the controller 130 can include purpose-built circuitry or instructions to perform various operations. That is, in some embodiments, the controller 130 can include circuitry or can be configured to perform instructions to control movement of data or addresses associated with data such as among the buffer 135, the cache 140, or the first memory device 145 or the second memory device 150.

In an example, at least one of the first host 110 or the controller 130 comprises a command manager (CM) for the memory system 125. The CM can receive a read command for a particular logic row address in the first memory device 145 or the second memory device 150. In an example, the CM can determine that the logical row address is associated with a first row based at least in part on a pointer stored in a register of the controller 130. In an example, the CM can receive from the first host 110 or the second host 160, a write command for a logical row address. In an example, the write command is associated with second data. In an example, the CM can be configured to issue, to non-volatile memory and between issuing the read command and the write command, an access command associated with the first memory device 145 or the second memory device 150. In an example, the CM can issue, to the non-volatile memory and between issuing the read command and the write command, an access command associated with the first memory device 145 or the second memory device 150.

In an example, the buffer 135 comprises a data buffer circuit that includes a region of a physical memory used to temporarily store data, for example, while the data is moved from one place to another. The buffer 135 can include a first-in, first-out (FIFO) queue in which the oldest (e.g., the first-in) data is processed first. In some embodiments, the buffer 135 includes a hardware shift register, a circular buffer, or a list.

In an example, the cache 140 comprises a region of a physical memory used to temporarily store particular data from the first memory device 145 or the second memory device 150. Generally, the cache 140 provides faster access to data than the backing memory. The cache 140 can include a pool of data entries. In an example, the cache 140 can be configured to operate according to a write-back policy in which data is written to the cache without being concurrently written to the first memory device 145. Accordingly, in some embodiments, data written to the cache 140 does not have a corresponding data entry in the first memory device 145. This can occur when, for example, data is written to the cache and deleted before a write-back is triggered to write the data into the first memory device 145, for example.

Figure 6:
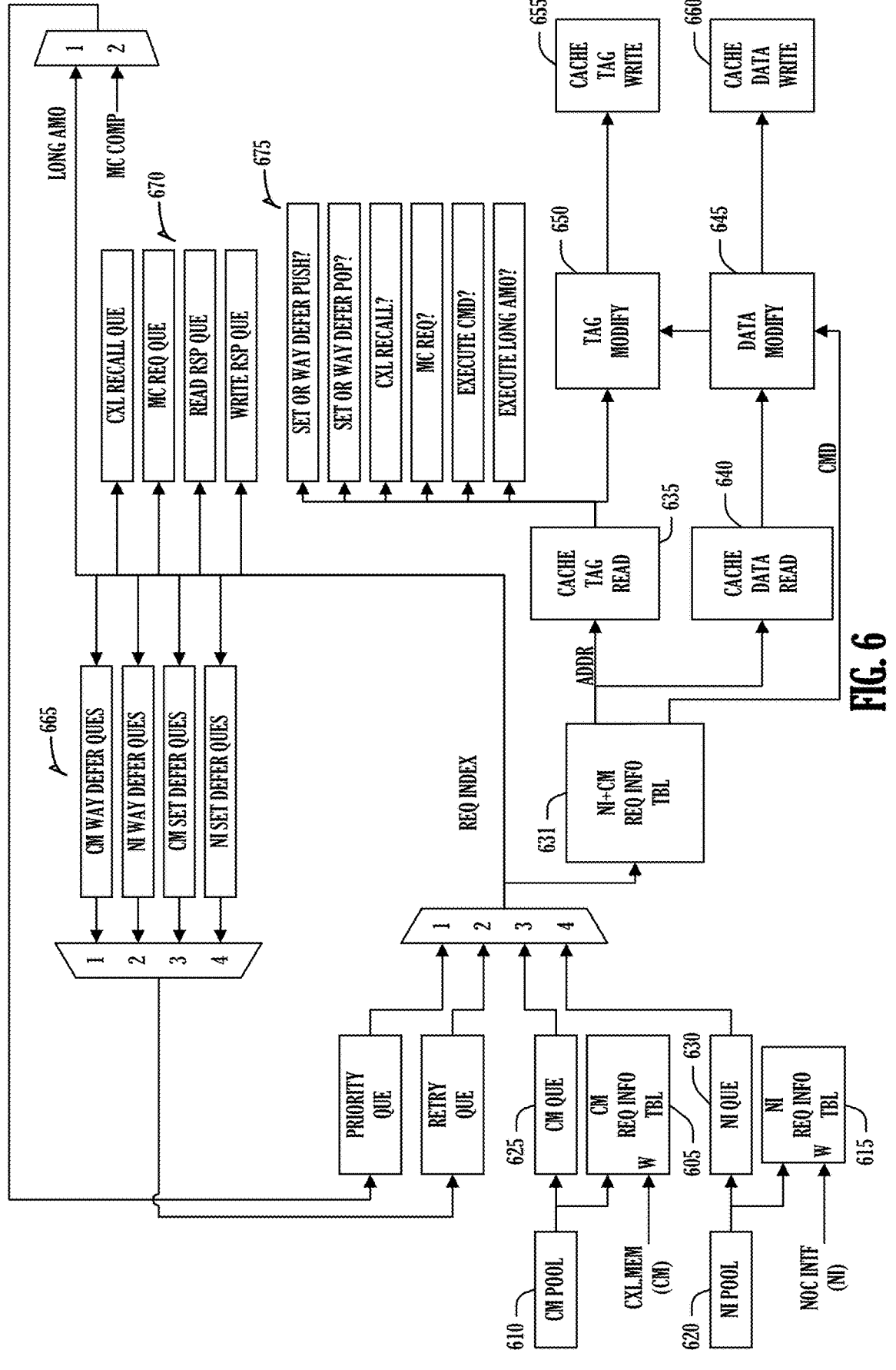
FIG. 6 illustrates example components of a memory device, according to an embodiment.

In an example, the cache 140 is implemented as a multi-way associative cache. Here, cache entries are divided by some portion of a memory address (e.g., a set number of significant bits). A group of cache entries (e.g., cache lines or ways), called a cache set herein, can be co-associated with a same bit-set from the memory address. Usually, the number of ways in a cache set is less than the total number of memory addresses to which the ways are associated. Thus, a way can be evicted to be associated with a new memory address in the range at various points. FIG. 6 illustrates some elements of this type of associative cache.

In an example, the controller 130 can receive write requests involving the cache 140 and cause data associated with each of the write requests to be written to the cache 140. The controller 130 can similarly receive read requests and cause data that is stored in, for example, the first memory device 145 or the second memory device 150, to be retrieved and written to, for example, the first host 110 via the interface 120 or the second host 160 via the interface 165. In an example, the controller 130 processes all requests for memory it controls through the cache 140. Thus, a read request will first check the cache 140 to determine if the data is already cached. If not, a read to the first memory device 145 is made to retrieve the data. The data is then written to the cache 140. In an example, the data is then read from the cache 140 and transmitted to the requesting entity, such as the first host 110 or the second host 160. Working exclusively through the cache can simplify some elements of the controller 130 hardware at the cost of a little latency.

Within the context of the system 105, the controller 130 can be configured to implement multi-format data objects in the memory system 125. To this end, the controller 130 can be configured (e.g., via software, instructions-hardwired circuits, or a combination thereof) to receive (e.g., on an interface that conforms to the CXL family of standards) an allocation request for a data object. This data object is made up of a set of data elements. For example, the data object can be a geographic location with the three integer data elements for latitude, longitude, and altitude respectively.

The received request also includes details for a set of formats for the data object. The formats represent different possible versions of the same data. However, some formats can have more and some less data. Consider the geographic coordinate above. A second format could include only latitude and longitude, excluding altitude. The "same data" here ensures that the latitude and longitude is consistent across the two formats, even though the second format does not have altitude. Other types of formatting can include whether the words are big endian or little endian, whether fields are defined by bit or Byte counts or have field headers, footers, etc.

The details about the format include the elements to allocate space in the memory (e.g., the first memory device 145) as well as to handle read or write requests in the various supported formats, represented by the set of formats. In an example, the format details for a first format include a size. Thus, the controller 130 is informed how much memory will be needed to store the first format of the data to the first memory device 145. In an example, the details for the first format include a base memory address. This enables the host 110, for example, to specify where in the memory the various formats will be stored, enabling the host to read directly from the appropriate format.

The details about the first format include one or both of a mapping or an identification of a conversion function between a first data element of the data object in the first format to a second data element in a second format in the set of formats. In this example, the first data element and the second data element represent (e.g., are derived from or a version of) the same data, such as both representing latitude in the example above. The conversion function is hardware or software that is configured (or causes processing circuitry to be configured) to convert the first data element to the second data element. Generally, if the data elements are of the same size, the conversion function would simply be a copy. However, for encryption, compression, changed precision (e.g., down-sampling data from the first element to a smaller size in the second element), the conversion is transformative yet ultimately represents the same data.

The controller 130 is configured to allocate space in memory (e.g., either the first memory device 145 or the second memory device 150) for a first version of the data object in the first format. The term "version" is used here to distinguish between the creation of the data object and the potential of the data object in a format. Accordingly, the first version is the creation of the first instantiation of the data object that happens to conform to the details of the first format. In an example, the allocation is based on the base memory address and the size in the allocation request. Thus, if given, a segment of memory of the specified size and starting at the base memory address is allocated to the requestor.

The controller 130 is configured to store the mapping in a mapping data structure corresponding to the data object. In an example, there is a different mapping data structure for each data object. In an example, there is a different mapping data structure for each type (e.g., or category) of data object (e.g., two different geographic coordinate data objects share the same mapping data structure). In an example, the mapping data structure is unified across different types of data objects. The mapping data structure can be a lookup table in which source elements (e.g., element indices) are used to locate an entry that points to the corresponding element in another format. However implemented, the mapping table enables correspondence determinations between data elements between different versions (created formats) of the data object. The mapping data structure can be stored in working memory of the controller 130, the first memory device 145, or other storage accessible to the controller 130.

The controller 130 is configured to store the identification of the conversion function in a conversion data structure corresponding to the data object. Similar to the mapping, the conversion function embodies a correspondence between data elements between data object versions. However, the conversion function can also transform the underlying bits between these data elements. In an example, the conversion function is software that is executed on the controller 130 or on a processor of the controller 130, such as the atomic processing circuitry 155. In an example, the identification of the conversion function is an address in the memory (e.g., the first memory device 145) for code (e.g., instructions) of the conversion function. In this example, a host (e.g., the host 110) would generally first write the conversion function to the first memory device 145. Then, the address of the conversion function is delivered in the allocation request. In an example, the identification of the conversion function is code of the conversion function. This last example acknowledges that the conversion function can be delivered as part of the allocation request. Further, in an example where the memory system 125 has built-in atomics, the identification can identify the atomic operation to perform.

Once the allocation for the data object is performed, at least once the mapping or conversion function data structures are updated, the controller 130 can serve read or write requests in any format of the data object. For example, the controller 130 is configured to provide access to the second format of the data object from the first format of the data object in the memory based on the mapping data structure or the conversion data structure. Consider the scenario where the geographic data object is allocated in the three-element first format. The host 160 requests the data object in the second two-element format. The controller uses the mapping data structure to locate the latitude and the longitude from the first version but fails to locate a mapping for the altitude and thus omits the altitude. Accordingly, the second version (second format) of the data object is returned to the host 160.

In an example, to provide access to the second format of the data object, the controller 130 is configured to receive a write request for the same data element of the data object. In an example, the write request includes an identifier for the first data element, the second data element, or an identification of the second format. The controller 130 is configured to then convert the second data element to the first data element using the conversion function in the conversion data structure. In an example, the conversion function is located (e.g., searched, indexed, etc.) in the conversion data structure based on the identification of the second format and the identifier for the same data element in the write request. To restate, these examples indicate the attempt to write (e.g., by the host 160) a data element of the allocated data object— which is in the first format—in the second format. The controller 130 uses the conversion function identified in the original allocation request and stored in the conversion data structure to convert the data in the write to the data appropriate for the first format version allocated in the memory.

In an example, the identifier for the first data element includes a memory address for the first data element. In an example, the identifier for the first data element includes the base memory address for the first format of the data object in the memory and an offset from the base memory address for the first data element. In these examples, the base memory address can be enough if the format is rigid (e.g., a finite number of fields of a set number of bits). However, with the base address and an offset, the controller 130 can directly locate the data element.

In an example, to provide access to the second format of the data object, the controller 130 is configured to receive a read request that includes identification of the second data element. In an example, first data element from the memory is converted to the second data element using the conversion function identified in the conversion data structure. The controller 130 can then communicate a response to the read request that includes the second data element. These examples represent a read in which the conversion is performed on-the-fly or on-demand.

In an example, the controller 130 is configured to allocate a second space in memory for a second version of the data object in the second format based on a second base memory address and a second size provided in the allocation request or in a second allocation request. In this example, a conversion between data elements in the first version of the data object to corresponding data elements in the second version of the data object can be performed using the conversion function identified in the conversion data structure. This example is a pre-processed second version of the data object rather than the on-demand implementation described above.

Once the second version of the data object has been pre-processed, reading can be a straightforward read into the second version. Thus, in an example, to provide access to the second format of the data object, the controller 130 is configured to receive a read request that identifies the first data element and specifies a response in the second format. The controller 130 retrieves the second data element from the second version of the data object in the memory (e.g., the first memory device 145) based on a mapping in the mapping data structure. In this example, the mapping provides a location in memory from the first data element to the second data element. Then, a response that includes the second data element can be made to the read request.

In an example, the controller 130 is configured to maintain a cache coherency data structure for the data object. In an example, the cache coherency data structure for the data object includes an entry corresponding to the first data element. In this example, the entry for the first data element is marked valid following completion of the write request. In an example, the entry for the first data element is marked invalid when exclusive access to the first data element is granted to another device. These examples illustrate how cache coherency signaling can be maintained across a multi-formatted data object.

Figure 2:
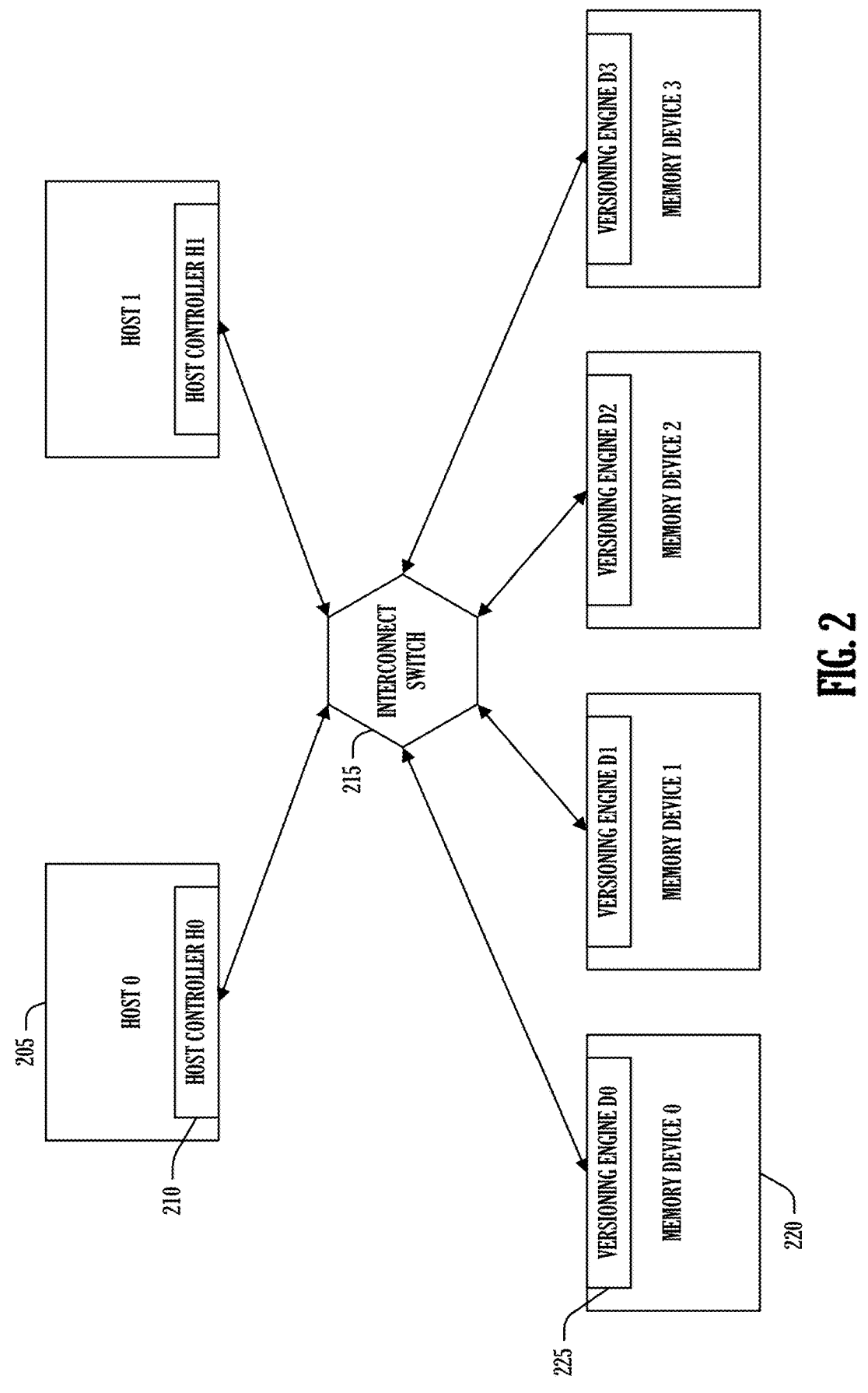
FIG. 2 illustrates an example of a system in which multiple hosts can access multi-format data objects through memory devices, according to an embodiment.

FIG. 2 illustrates an example of a system in which multiple hosts can access multi-format data objects through memory devices, according to an embodiment. As illustrated, several hosts (e.g., CPUs, GPUs, FPGAs, or other processors), such as the host 205 are connected to memory devices, such as the memory device 220, through an inter-connect switch 215. The interconnect switch can use a variety of hardware or software standards for implementation, such as the CXL family of standards. The host 205 includes a host controller 210 to interface with the interconnect switch 215 and to interact with the memory device 220.

The memory device 220 includes a versioning engine 225. The versioning engine 225 is implemented in processing circuitry of the memory device 220 and can be a standalone block or component of the memory device 220 or the versioning engine 225 can be included in a memory controller or other standard component of the memory device 220. The versioning engine 225 operates on the requests of the host 205 to translate or convert requests between different formats of the same data object held by the memory device 220. The versioning engine 225 uses the mapping or conversion functions provided by the host 205 at data object allocation to perform these tasks.

In the context of the illustrated system, the following examples can be considered. Consider configuring a multi-format data object. The host 205, when allocating memory for all possible versions of a data object, can notify the versioning engine 225 on the target memory device 220 of the following information:

The base address and size of every version of the data object

A matrix of mapping functions or function pointers from X (row) to Y (column). These mapping functions provide a way to convert between any pair of formats. In an example, there is at least one pointer in each row and column.

A matrix of conversion functions similar to the mapping functions above that also convert the data elements of the data object into the new format. The following is an example of a conversion function mapping table (e.g., data structure):

| From/To | Version 0 | Version 1 | Version 2 |
|---|---|---|---|
| Version 0 | N/A | F01 | |
| Version 1 | | N/A | F12 |
| Version 2 | F20 | | N/A |

In the example of this table, if the user writes to an element of Version 0 of a data object, then Version 1 of the data object is updated by calling F01 and Version 2 of the data object is updated by calling F12. In general, the greater number of functions provides better system performance by enabling more updates to be performed in parallel.

Now, consider format conversions using programmable functions. Mapping functions can be used by the versioning engine 225 for read requests that specify data element IDs or offsets. The mapping function takes these inputs and provides the location of the byte address of the data element in memory as the output. In an example, the mapping functions can accept an address of a data element being accessed in a current version, and a target version, as input. The mapping function can provide a byte address of the data element in the target version as output.

Conversion functions can be used by the versioning engine 225 to update an inconsistent version, for example, in response to a read request to an invalid data element of a current version during lazy (e.g., on-demand) implementations or in response to a write to another version during proactive implementations (e.g., pre-allocated). In an example, the conversion function can accept the address of the data element being accessed in the current version, the target version, and a data value as input. The conversion function overwrites the target data element in the target version reference in the input with the data from the input.

Cache coherence can be impacted by multi-formatted objects in memory. It is possible that another device (e.g., memory device 2) or host (e.g., host 1) has a version of a data element in its local cache when the data element is being written to the memory device 220. Often, all memory addresses in the system will be under the control of a cache coherence protocol, such as that defined by CXL or the standard Modified Exclusive Shared Invalid (MESI) protocol.

When the host 205 writes a data element in the data object, the modification of the data element typically provokes a state change to Modified (e.g., in the MESI protocol) in the local (to the writer) cache. The coherence protocol invalidates all other copies of that address in other caches to, for example, provoke those other entities to re-read the data element from the memory device 220. However, these protocols do not extend to other versions of the data element.

To address the coherency issues, and to maintain data consistency of versions, the host 205 can flush a modified cache line immediately—or the data object address space can be configured as non-cacheable—causing a write to the data element to be visible to the memory device 220. Here, the memory device 220 immediately invalidates all other cached copies of all versions of the data element. This can be accomplished using memory protocol coherence commands that are available, for example, in CXL or Gen-Z. In an example, the mapping functions can be used to calculate the byte addresses of the data element across all versions of the data object. Once caches are invalidated, either proactive or lazy version updates can proceed as usual.

Another approach can enable the modified version to remain in cache. In this example, the memory device hosting the data element participates in the coherence protocol to be notified of "Read Exclusive" or BusReadX coherence probes sent out from a caching agent that wrote the data element. This approach is similar to above in that, upon receiving the BusReadX, an invalidation message is sent to all other caching devices that possibly have a copy of any version of the data element. In order to maintain data consistency, the memory device 220 can delay a response to BusReadX until all invalidations have occurred. In some protocols, this behavior can cause a deadlock.

Hardware coherency can cause a slowdown depending on the amount of extra coherence traffic generated in the system for each write, and the type of coherence protocol. Software coherence techniques can be used as an alternative. Here, function calls in a program can signal the memory device 220 whenever data has been modified and flushed to memory or when data is recalled by the memory device 220. This signal can then trigger the memory device 220 to update data object versions and send invalidations in a bulk operation, for example, for an entire data object. In an example, the software can invalidate its own cached copies of other versions. Software can wait (e.g., a barrier function or spin lock) for hardware to set a flag indicating the update is complete before proceeding.

Multi-format data objects can also impact memory management. In some examples described above, the host 205 allocates (e.g., requests memory to be allocated) memory for all versions of the data object at the same time (e.g., upfront). In an example, by adding a "reconfigure object" command, the host 205 can allocate a different amount of space or move one or more of the data object versions around in memory. Here, the host 110 can instruct the memory device 220 the new starting addresses or sizes of each new version, essentially re-initializing the new version of the data object. In an example, the memory device 220 can manage the memory management of the data object similar to the host-based memory management just mentioned. Here, however, any changes made by the memory device 220 would generally be communicated back to the host 205.

In an example, data objects can be shared between multiple Hosts or other memory devices. For example, using a Fabric-Attached Memory software API and libraries, such as OpenFAM: A Library for Programming Fabric-Attached Memory. In OpenFAM, data objects can be named when allocated, to be accessed by any host. In an example, data objects can be interleaved across memory devices to, for example, exploit scale or parallelism. For example, software can be used to allocate entire data objects across memory devices, for example, in a round-robin allocation. In an example, the software can be used to split data objects into multiple smaller objects (e.g., subsets of data elements), each data object allocated to a different memory device. In an example, hardware can be used to interleave data objects across multiple memory devices, for example, by the host-side controller 210 or the switch 215 between hosts and memory devices. Generally, when objects are interleaved, element IDs are adjusted according to the interleaving. For example, the most-significant bits can be removed before passing the data object ID to the target memory device.

Figure 3:
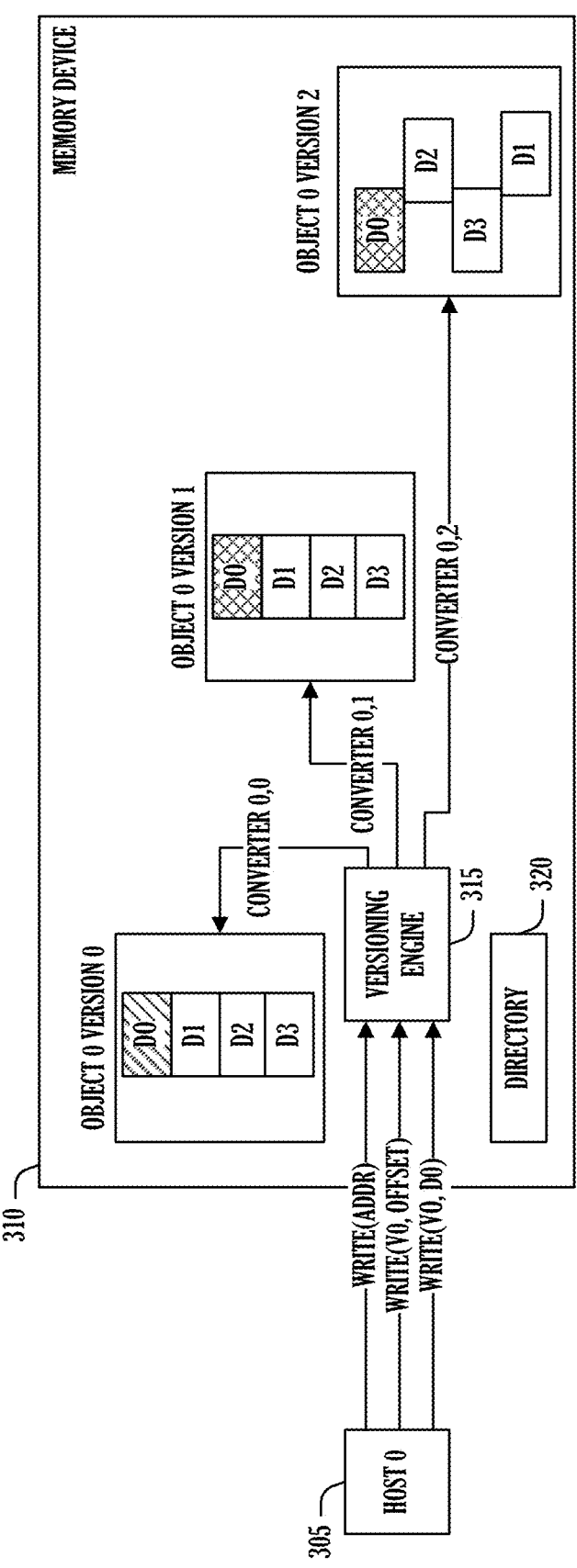
FIG. 3. illustrates an example of host and memory device interactions to write a multi-format object, according to an embodiment.

FIG. 3. illustrates an example of host 305 and memory device 310 interactions to write a multi-format object, according to an embodiment. In general, when accessing a multi-formatted object, the interactions can be on-demand (e.g., lazy) or proactive (e.g., pre-allocated). Again, an on-demand interaction is one in which conversion of a data element—by the versioning engine 315—from one version doesn't occur until a read is performed. The proactive approach differs in that all of the versions of the data object are updated on a write to any version of the data object, or to specific versions of the data object. In an example, these updates can be performed as a background task (e.g., facilitated by the versioning engine 315) when the memory device 310 is idle or bandwidth is underutilized.

In an example, the directory 320 in reserved memory space (e.g., for each allocated data object) that tracks the state of data elements. In an example, the state can be tracked with a VALID or an INVALID state bit for every version of each data element. In an example, as a space-saving simplification, larger groups of data elements can be tracked such that a single INVALID data element in the group causes all data elements in the group to be treated as INVALID. The state data in the directory 320 can be used to maintain consistency among versions of the data elements and thus consistency between versions of the data object.

In an example, all data elements for all versions start as INVALID. After being written by the host 305 or updated by the version engine 315, a data element is marked VALID. When the on-demand implementation (e.g., mode) is used, after a write to a data element, the data element in all other versions of the data object is marked INVALID. Here, during the update to the various versions of the data element, reads to any version of the data element are prevented. This can be implemented by delaying read responses. Because updates are on fine-grained data elements rather than entire data objects, this practice will generally not cause significant performance penalties.

When in the proactive implementation, after a write to a data element, all other versions of the data element are updated by invoking a sequence of one or more conversion functions. Once complete, the directory 320 entries for the data element across these versions are marked VALID.

The scenario illustrated in FIG. 3 illustrates how a write replaces the data value D0 in Version 0 of object 1. This can be requested by the host 305 either using a flat physical or virtual address, a version ID (e.g., number) with a byte offset, or the version ID with a data element index. As noted above, writes cause data items in other versions to be invalidated or updated, depending on the mode.

Figure 4:
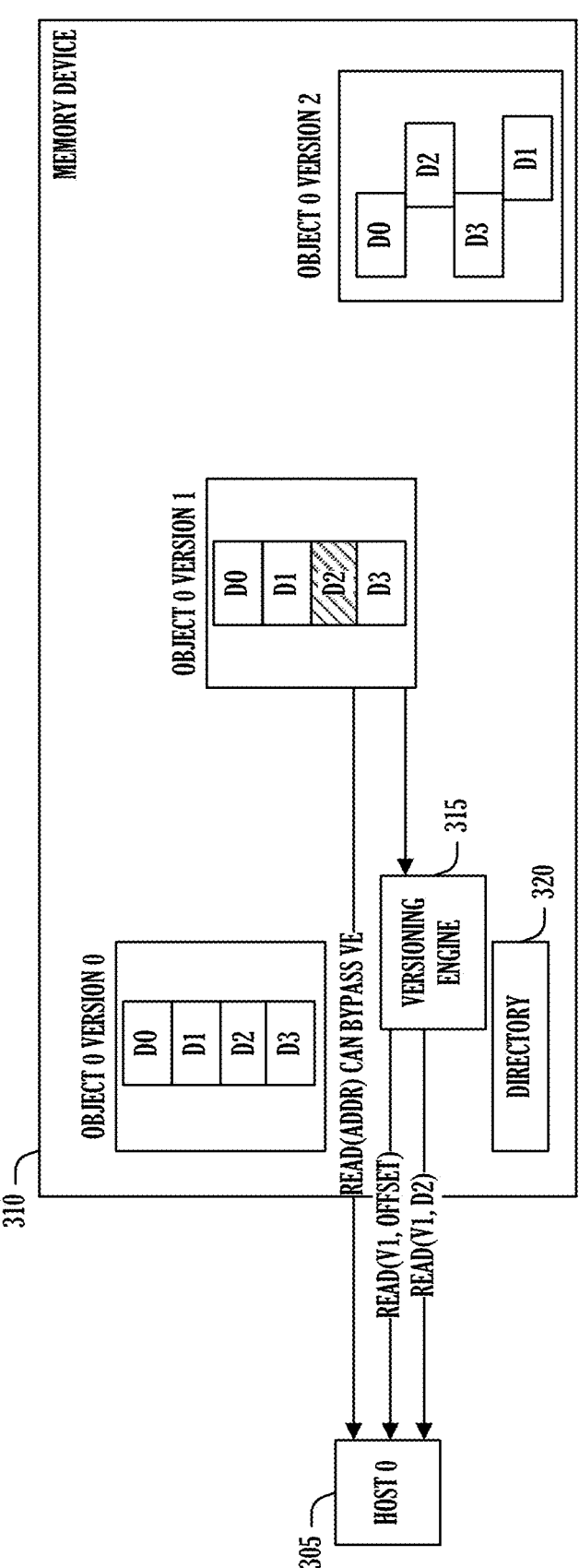
FIG. 4. illustrates an example of host and memory device interactions to read a multi-format object, according to an embodiment

FIG. 4. illustrates an example of host and memory device interactions to read a multi-format object, according to an embodiment. Here, the data element D2 is being read for the target Version 1 of Object 0. In the proactive implementation, the host 305 can directly reference the memory address to obtain the data element D2. The host 305 can use the alternative identification mechanisms that identify the version (Version 1) and either identify an offset or data element ID in either the on-demand or proactive implementations. In these cases, the versioning engine 315 either locates the data element via the mapping function or converts the data element via the conversion function as appropriate.

Figure 5:
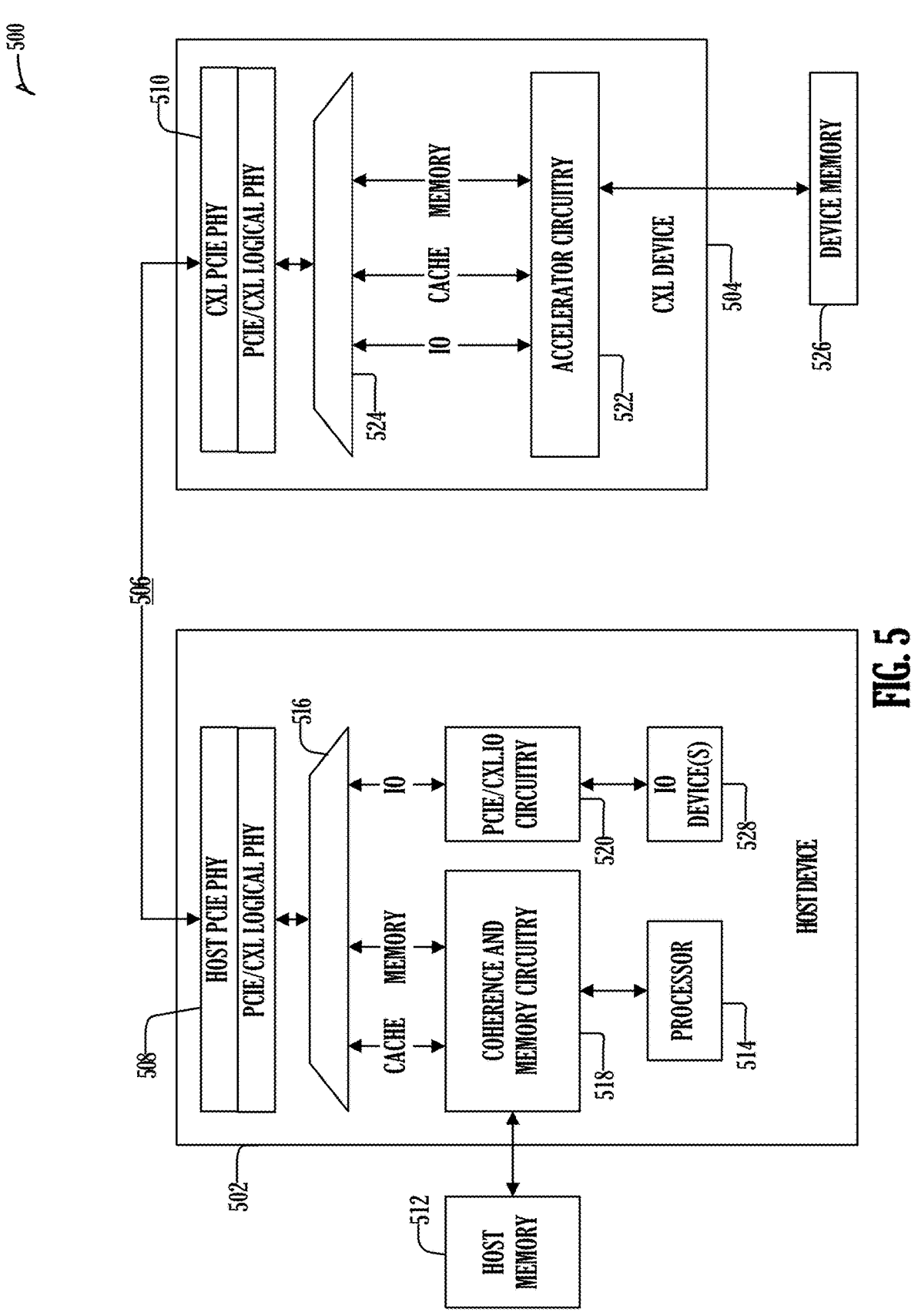
FIG. 5 illustrates an example of a host connected to a CXL device, according to an embodiment.

FIG. 5 illustrates an example of a host connected to a CXL device, according to an embodiment. FIG. 5 illustrates generally an example of a CXL system 500 that uses a CXL link 506 to connect a host device 502 and a CXL device 504 via a host physical layer PCIE interface 508 and a CXL client physical layer PCIE interface 510 respectively. In an example, the host device 502 comprises or corresponds to the first host 110 (or the second host 160) and the CXL device 504 comprises or corresponds to the memory system 125 from the example of the system 105 in FIG. 1. A memory system command manager can comprise a portion of the host device 502 or the CXL device 504. In an example, the CXL link 506 can support communications using multiplexed protocols for caching (e.g., CXL.cache), memory accesses (e.g., CXL.mem), and data input/output transactions (e.g., CXL.io). CXL.io can include a protocol based on PCIe that is used for functions such as device discovery, configuration, initialization, I/O virtualization, and direct memory access (DMA) using non-coherent load-store, producer-consumer semantics. CXL.cache can enable a device to cache data from the host memory (e.g., from the host memory 512) using a request and response protocol. CXL.memory can enable the host device 502 to use memory attached to the CXL device 504, for example, in or using a virtualized memory space. In an example, CXL.memory transactions can be memory load and store operations that run downstream from or outside of the host device 502.

In the example of FIG. 5, the host device 502 includes a host processor 514 (e.g., comprising one or more CPUs or cores) and IO device(s) 528. The host device 502 can comprise, or can be coupled to, host memory 512. The host device 502 can include various circuitry (e.g., logic) configured to facilitate CXL-based communications and transactions with the CXL device 504. For example, the host device 502 can include coherence and memory circuitry 518 configured to implement transactions according to CXL-.cache and CXL.mem semantics, and the host device 502 can include PCIe circuitry 520 configured to implement transactions according to CXL.io semantics. In an example, the host device 502 can be configured to manage coherency of data cached at the CXL device 504 using, e.g., its coherence and memory circuitry 518.

The host device 502 can further include a host multiplexer 516 configured to modulate communications over the CXL link 506 (e.g., using the PCIe PHY layer). The multiplexing of protocols ensures that latency-sensitive protocols (e.g., CXL.cache and CXL.memory) have the same or similar latency as a native processor-to-processor link. In an example, CXL defines an upper bound on response times for latency-sensitive protocols to help ensure that device performance is not adversely impacted by variation in latency between different devices implementing coherency and memory semantics.

In an example, symmetric cache coherency protocols can be difficult to implement between host processors because different architectures can use different solutions, which in turn can compromise backward compatibility. CXL can address this problem by consolidating the coherency function at the host device 502, such as using the coherence and memory circuitry 518.

The CXL device 504 can include an accelerator device that comprises various accelerator circuitry 522. In an example, the CXL device 504 can comprise, or can be coupled to, CXL device memory 526. The CXL device 504 can include various circuitry configured to facilitate CXL-based communications and transactions with the host device 502 using the CXL link 506. For example, the accelerator circuitry 522 can be configured to implement transactions according to CXL.cache, CXL.mem, and CXL.io semantics. The CXL device 504 can include a CXL device multiplexer 524 configured to control communications over the CXL link 506. The accelerator circuitry 522 can be one or more processors that can perform one or more tasks. Accelerator circuitry 522 can be a general-purpose processor or a processor designed to accelerate one or more specific workloads.

FIG. 6 illustrates example components of a memory device, according to an embodiment. The illustrated components are part of a memory controller, such as those described above (e.g., the controller 130 illustrated in FIG. 1) implementing a memory-side cache (MSC). The illustrated components include elements to address internal (e.g., from a near-memory accelerator) and external (e.g., received from a host via a CXL link) request differences used to maintain CXL protocol requirements, such as maintaining forward progress of CXL memory (CM) requests.

As illustrated, CM refers to CXL memory or other external requests and NI refers to requests coming from a NOC interface or other internal requests. Requests from CXL.mem are written to the CM Request Information Table 605. The entry in the CM Request Information Table 605 to which a request is written is obtained from the CM Request Information Table Pool 610. The CM Request Information Table Pool 610 maintains a list of indices to CM Request Information Table entries that are available (e.g., free, or unused). Requests from an accelerator within the device are written to the NI Request Information Table 615 using the NI Request Information Table Pool 620 for the available entry indices. The two pools—the CM Request Information Table Pool 610 and the NI Request Information Table Pool 620—are configured such that accelerator requests (e.g., internal requests) cannot consume all table entries. Thus, for example, if an additional NI request arrives and there is no free entry indicated in the NI Request Information Table Pool 620, the request is stalled until an entry is available. Here, the request can stay in the in-bound queue until an entry is available.

CXL.mem requests from the CM queue 625 are selected at higher priority than NI requests in the NI queue 630 to ensure forward progress of the CM requests. In an example, as illustrated, when a request is selected from either the CM queue 625 or the NI queue 630, the request information is written into the NI+CM Request Information Table 631. Hereafter, each request is represented in the various queues by an identifier (e.g., index) to an entry of the NI+CM Request Information Table 631. This arrangement can reduce the storage requirements and bandwidth in transferring the request information among the various queues at different processing points in the controller. When an aspect of the request is needed by a processing point, such as an address for a read, the identifier is used to reference the entry in the NI+CM Request Information Table 631 and retrieve the field of the request corresponding to the needed aspect. As with the CM Request Information Table 605 and the NI Request Information Table 615, a free list, or pool, of entries can be used to quickly determine which entries are available to store request information in the NI+CM Request Information Table 631.

When a request is selected, a cache tag 635 for a cache line (e.g., cache way) corresponding to an address in the request can be checked to determine whether the requests will be deferred (e.g., processed later). Deferral of the request is generally required when there is no available (e.g., free) way line entry in a cache set for the address in the request. If no deferral occurs, the cache data can be read 640 or modified 645 (e.g., for a write), and the way tag can be modified 650. Modifying the tag 650 or the cache data 645 can respectively be written to backing memory, such as in writing the tag data 655 and the cache way data 660.

When the request is deferred, the request entry identifier (e.g., from the NI+CM Request Information Table 631) is pushed to either the CM or NI defer queues 665. The way defer queues 665 are used when there is a way corresponding to the address in the request, but the way is busy (e.g., waiting for another command to complete). The set defer queues 665 are used when there is no way that corresponds to the address. The request remains queued until a way is available (e.g., not busy). In an example, there are separate CM and NI defer queues 665 for each cache set within the cache.

The external control queues 670 manage external responses to the cache, such as responses to reads or writes to the backing memory, memory controller (MC) requests, or CXL recalls. A CXL recall is a request by the memory device to regain control of a cache way from the host. The recall is requested of the host and the host communicates the control of the cache way to the memory controller, for example, in CXL meta state. This procedure can be called a bias flip as the control bias for the cache way is flipped from the host to the controller or vice versa. This technique is used to enable cache coherency between any host cache and the memory device.

The command queues 675 track requests through a variety of processing points, such as whether to push or pop requests from defer queues 665, whether a CXL recall is initiated, memory controller requests, executing a command, or executing an atomic memory operation (AMO). The reference to a long AMO is an AMO that cannot complete within a single execution cycle (e.g., a clock cycle). An AMO is a near-memory operation completed by an accelerator of the memory controller.

The illustrated control and data paths are configured such that separate storage, queuing, and request prioritization enables forward progress on CM requests while executing in the presence of NI requests. Thus, CM requests will not be delayed by an NI request.

FIG. 6 illustrates an example of an associative cache, according to an embodiment. Here, the associative cache includes four cache sets, cache set zero 605, cache set one 610, cache set two 615, and cache set three 620. Note that each cache set corresponds to a memory address range. Thus, cache set one corresponds to all memory elements with an address prefixed by 00 while cache set three 615 corresponds to all memory elements with an address prefixed by 10. The cache lines within each cache set represent a storage element (e.g., register) sized for an element in the memory. Each cache line can also be called a "way." Thus, as illustrated, the associative cache is a four-way associative cache because four ways can be used for each cache set. Generally, memory requests with addresses in one cache set will load a way until all of the ways are used. With the arrival of another memory request, a process to evict a way to load the new data can be undertaken to free the way for the new memory request.

The associative cache can maintain metadata for the ways. Thus, as illustrated, the associative cache includes a tag (e.g., metadata) in addition to the way data, resulting in the way zero tag and data 625, the way one tag and data 630, the way two tag and data 635, and the way three tag and data 640. Examples of tag data can include a dirty bit to indicate whether the way is out-of-sync with the backing memory, whether there is an operation to synchronize the way with host memory (e.g., a host recall is underway), or CXL meta-state, request state, among others. In an example, when the source (e.g., internal, or external) of the request impacts operation of the memory controller, the tag data can include designation of whether the request is internal or external as well as, for example, whether the request is internal and deferred, or external and deferred.

Figure 7:
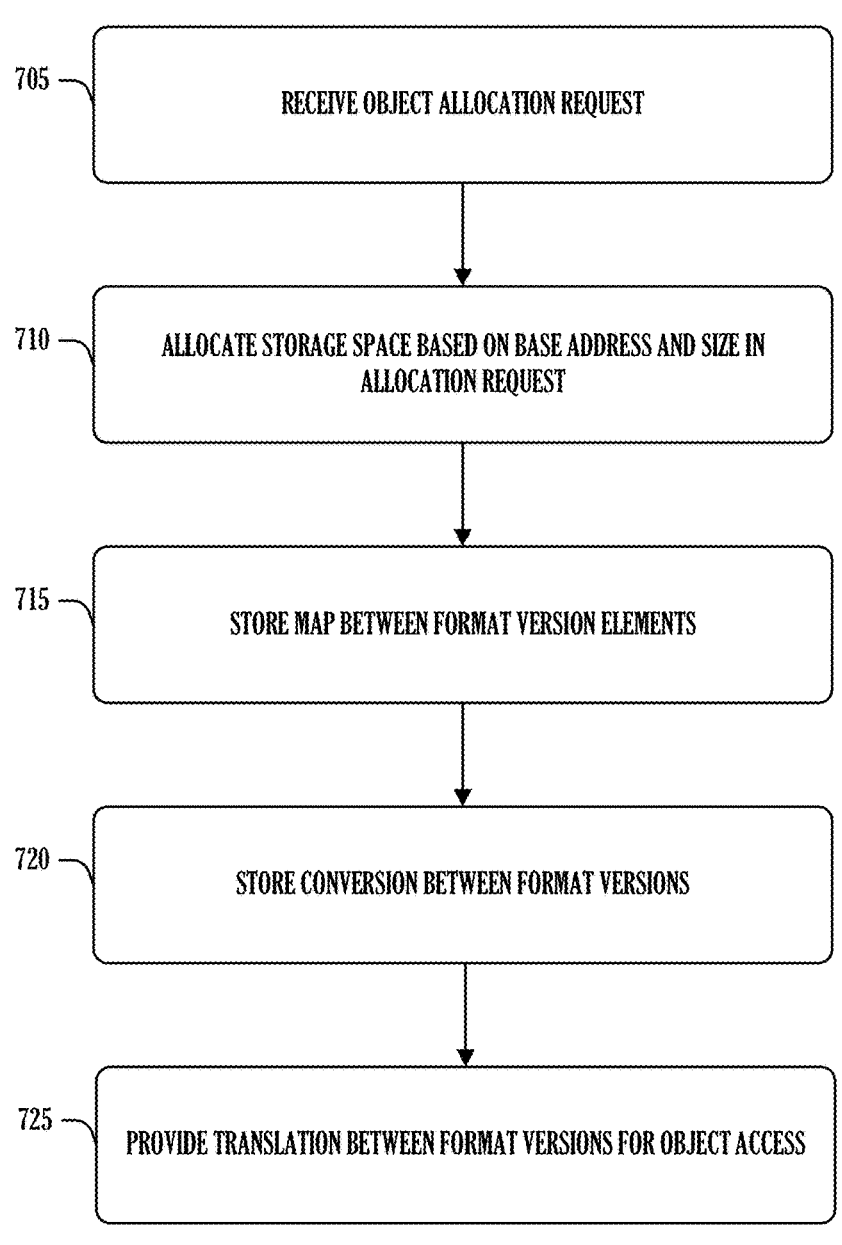
FIG. 7 illustrates a flow diagram of an example of a method for hybrid cache coherency, according to an embodiment.

FIG. 7 illustrates a flow diagram of an example of a method 700 for multi-format data objects in memory, according to an embodiment. The operations of the method 700 are performed by a device and implemented in hardware (e.g., computational hardware) such as that described above or below (e.g., processing circuitry).

At operation 705, an allocation request for a data object is received (e.g., at a device interface, such as those that conform to a Compute Express Link (CXL) family of standards). In this example, the data object includes a set of data elements, and the request includes details for a set of formats for the data object. In an example, the details for a first format in the set of formats can includes a base memory address, a size, a mapping between a first data element of the data object in the first format to a second data element in a second format in the set of formats—the first data element and the second data element representing a same data element—or identification of a conversion function configured to convert the first data element to the second data element.

At operation 710, the memory device (e.g., circuitry therein) allocates space in memory for a first version of the data object in the first format. In an example, the allocation is based on the base memory address and the size in the allocation request.

At operation 715, the mapping is stored in a mapping data structure corresponding to the data object.

At operation 720, the identification of the conversion function is stored in a conversion data structure corresponding to the data object. In an example, the memory device includes a processor, and the conversion function is software that is executed on the processor. In an example, the identification of the conversion function is an address in the memory for code (e.g., instructions) of the conversion function. In an example, the identification of the conversion function is code of the conversion function.

At operation 725, access to the second format of the data object is provided from the first format of the data object in the memory based on the mapping data structure or the conversion data structure. In an example, providing access to the second format of the data object includes receiving (e.g., on the interface) a write request for the same data element of the data object. In an example, the write request includes an identifier for the first data element, the second data element, or an identification of the second format. The device (e.g., circuitry therein) then converts the second data element to the first data element using the conversion function in the conversion data structure. In an example, the conversion function is located (e.g., searched, indexed, etc.) in the conversion data structure based on the identification of the second format and the identifier for the same data element in the write request.

In an example, the identifier for the first data element includes a memory address for the first data element. In an example, the identifier for the first data element includes the base memory address for the first format of the data object in the memory and an offset from the base memory address for the first data element.

In an example, providing access to the second format of the data object includes receiving a read request that includes identification of the second data element. The first data element from the memory can then be converted to the second data element using the conversion function identified in the conversion data structure. A response, to the read request, that includes the second data element can be communicated (e.g., by the device circuitry on the device interface).

The operations of the method 700 can be expanded to include allocating a second space in memory for a second version of the data object in the second format based on a second base memory address and a second size provided in the allocation request or in a second allocation request. In this example, a conversion between data elements in the first version of the data object to corresponding data elements in the second version of the data object can be performed using the conversion function identified in the conversion data structure. In an example, providing access to the second format of the data object includes receiving a read request that identifies the first data element and specifies a response in the second format. The second data element can be retrieved from the second version of the data object in the memory based on a mapping in the mapping data structure. In this example, the mapping provides a location in memory from the first data element to the second data element. Then, a response that includes the second data element can be made to the read request.

In an example, a cache coherency data structure for the data object includes an entry corresponding to the first data element. In this example, the entry for the first data element is marked valid following completion of the write request. In an example, the entry for the first data element is marked invalid when exclusive access to the first data element is granted to another device.

Figure 8:
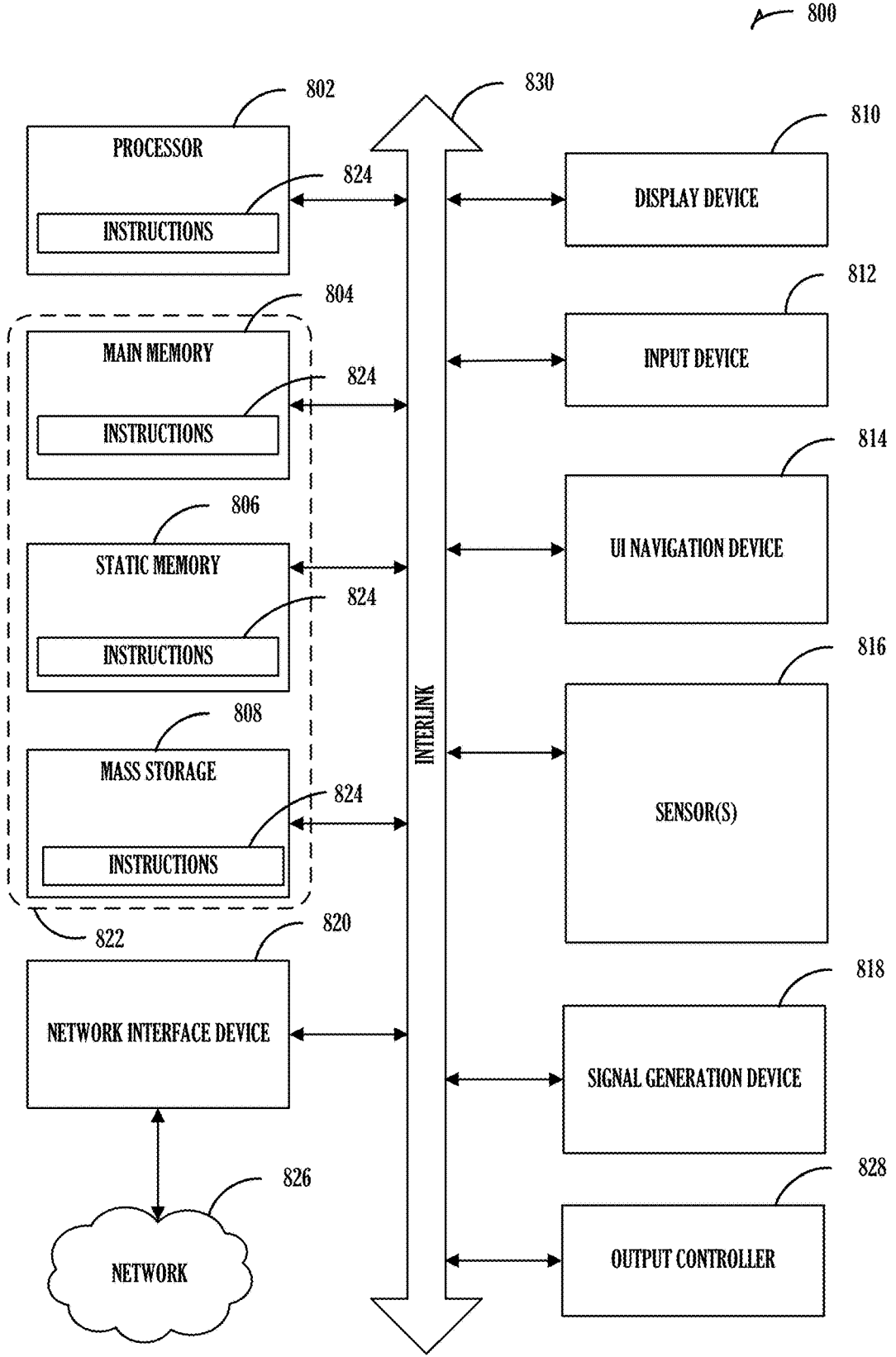
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may perform. Examples, as described herein, may include, or may operate by, logic or a number of components, or mechanisms in the machine 800. Circuitry (e.g., processing circuitry) is a collection of circuits implemented in tangible entities of the machine 800 that include hardware (e.g., simple circuits, gates, logic, etc.). Circuitry membership may be flexible overtime. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 800 follow.

In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 800 may include a hardware processor 802 (e.g., a central processing unit (CPU), a graphics processing unit (GPU), a hardware processor core, or any combination thereof), a main memory 804, a static memory (e.g., memory or storage for firmware, microcode, a basic-input-output (BIOS), unified extensible firmware interface (UEFI), etc.) 806, and mass storage 808 (e.g., hard drives, tape drives, flash storage, or other block devices) some or all of which may communicate with each other via an interlink (e.g., bus) 830. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 808, a signal generation device 818 (e.g., a speaker), a network interface device 830, and one or more sensors 816, such as a global positioning system (GPS) sensor, compass, accelerometer, or another sensor. The machine 800 may include an output controller 838, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 802, the main memory 804, the static memory 806, or the mass storage 808 may be, or include a machine readable medium 832 on which is stored one or more sets of data structures or instructions 834 (e.g., software) embodying or utilized by any one or more of the techniques or functions described herein. The instructions 834 may also reside, completely or at least partially, within any of registers of the processor 802, the main memory 804, the static memory 806, or the mass storage 808 during execution thereof by the machine 800. In an example, one or any combination of the hardware processor 802, the main memory 804, the static memory 806, or the mass storage 808 may constitute the machine readable media 832. While the machine readable medium 832 is illustrated as a single medium, the term "machine readable medium" may include a single medium or multiple media (e.g., a centralized or distributed database, and/or associated caches and servers) configured to store the one or more instructions 834.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon-based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 832 may be representative of the instructions 834, such as instructions 834 themselves or a format from which the instructions 834 may be derived. This format from which the instructions 834 may be derived may include source code, encoded instructions (e.g., in compressed or encrypted form), packaged instructions (e.g., split into multiple packages), or the like. The information representative of the instructions 834 in the machine readable medium 832 may be processed by processing circuitry into the instructions to implement any of the operations discussed herein. For example, deriving the instructions 834 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 834.

In an example, the derivation of the instructions 834 may include assembly, compilation, or interpretation of the information (e.g., by the processing circuitry) to create the instructions 834 from some intermediate or preprocessed format provided by the machine readable medium 832. The information, when provided in multiple parts, may be combined, unpacked, and modified to create the instructions 834. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 834 may be further transmitted or received over a communications network 836 using a transmission medium via the network interface device 830 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others. In an example, the network interface device 830 may include one or more physical jacks (e.g., Ethernet, coaxial, or phone jacks) or one or more antennas to connect to the communications network 836. In an example, the network interface device 830 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software. A transmission medium is a machine readable medium.

Additional Notes & Examples

Example 1 is a device implementing a multi-format data object in memory, the device comprising: an interface configured to communicate with an external entity; and processing circuitry configured to: receive, at the interface, an allocation request for a data object, the data object including a set of data elements, the allocation request including respective details for a set of formats for the data object, details for a first format in the set of formats including: a base memory address; a size; a mapping between a first data element of the data object in the first format to a second data element in a second format in the set of formats, the first data element and the second data element representing a same data element; and identification of a conversion function configured to convert the first data element to the second data element; allocate a space in memory managed by the device for a first version of the data object in the first format based on the base memory address and the size in the allocation request; store the mapping in a mapping data structure corresponding to the data object; store the identification of the conversion function in a conversion data structure corresponding to the data object; and provide access to the second format of the data object from the first format of the data object in the memory based on the mapping data structure or the conversion data structure, the second format including the second data element.

In Example 2, the subject matter of Example 1, wherein, to provide access to the second format of the data object, the processing circuitry is configured to: receive, on the interface, a write request for the same data element of the data object, the write request including: an identifier for the first data element; the second data element; and an identification of the second format; and convert, for storage in the memory, the second data element to the first data element using the conversion function in the conversion data structure, the conversion function located based on the identification of the second format and the identifier for the same data element in the write request.

In Example 3, the subject matter of Example 2, wherein the identifier for the first data element includes a memory address for the first data element.

In Example 4, the subject matter of any of Examples 2-3, wherein the identifier for the first data element includes the base memory address for the first format of the data object in the memory and an offset from the base memory address for the first data element.

In Example 5, the subject matter of any of Examples 2-4, wherein a cache coherency data structure for the data object includes an entry corresponding to the first data element, and wherein the entry for the first data element is marked valid following completion of the write request.

In Example 6, the subject matter of Example 5, wherein the entry for the first data element is marked invalid when exclusive access to the first data element is granted to another device.

In Example 7, the subject matter of any of Examples 1-6, wherein, to provide access to the second format of the data object, the processing circuitry is configured to: receive, on the interface, a read request, the read request including identification of the second data element; convert the first data element from the memory to the second data element using the conversion function identified in the conversion data structure; and communicate, on the interface, a response to the read request, the response including the second data element.

In Example 8, the subject matter of any of Examples 1-7, wherein the processing circuitry is configured to: allocate a second space in memory for a second version of the data object in the second format based on a second base memory address and a second size provided in the allocation request or in a second allocation request; and convert data elements in the first version of the data object to corresponding data elements in the second version of the data object using the conversion function identified in the conversion data structure.

In Example 9, the subject matter of Example 8, wherein, to provide access to the second format of the data object, the processing circuitry is configured to: receive, on the interface, a read request, the read request including identification of the first data element and specifying a response in the second format; retrieve the second data element from the second version of the data object in the memory based on a mapping in the mapping data structure, the mapping providing a location in memory from the first data element to the second data element; and communicate, on the interface, a response to the read request, the response including the second data element.

In Example 10, the subject matter of any of Examples 1-9, wherein the processing circuitry is a processor, and wherein the conversion function is software that is executed on the processor.

In Example 11, the subject matter of Example 10, wherein the identification of the conversion function is an address in the memory for code of the conversion function.

In Example 12, the subject matter of any of Examples 10-11, wherein the identification of the conversion function is code of the conversion function.

In Example 13, the subject matter of any of Examples 1-12, wherein the interface conforms to a Compute Express Link (CXL) family of standards.

Example 14 is a method for a multi-format data object in memory, the method comprising: receiving, at an interface of a memory device, an allocation request for a data object, the data object including a set of data elements, the allocation request including respective details for a set of formats for the data object, details for a first format in the set of formats including: a base memory address; a size; a mapping between a first data element of the data object in the first format to a second data element in a second format in the set of formats, the first data element and the second data element representing a same data element; and identification of a conversion function configured to convert the first data element to the second data element; allocating, by circuitry of the memory device, a space in memory of the memory device for a first version of the data object in the first format based on the base memory address and the size in the allocation request; storing the mapping in a mapping data structure corresponding to the data object; storing the identification of the conversion function in a conversion data structure corresponding to the data object; and providing access to the second format of the data object from the first format of the data object in the memory based on the mapping data structure or the conversion data structure, the second format including the second data element.

In Example 15, the subject matter of Example 14, wherein providing access to the second format of the data object includes: receiving, on the interface, a write request for the same data element of the data object, the write request including: an identifier for the first data element; the second data element; and an identification of the second format; and converting, by the circuitry for storage in the memory, the second data element to the first data element using the conversion function in the conversion data structure, the conversion function located based on the identification of the second format and the identifier for the same data element in the write request.

In Example 16, the subject matter of Example 15, wherein the identifier for the first data element includes a memory address for the first data element.

In Example 17, the subject matter of any of Examples 15-16, wherein the identifier for the first data element includes the base memory address for the first format of the data object in the memory and an offset from the base memory address for the first data element.

In Example 18, the subject matter of any of Examples 15-17, wherein a cache coherency data structure for the data object includes an entry corresponding to the first data element, and wherein the entry for the first data element is marked valid following completion of the write request.

In Example 19, the subject matter of Example 18, wherein the entry for the first data element is marked invalid when exclusive access to the first data element is granted to another device.

In Example 20, the subject matter of any of Examples 14-19, wherein providing access to the second format of the data object includes: receiving, on the interface, a read request, the read request including identification of the second data element; converting the first data element from the memory to the second data element using the conversion function identified in the conversion data structure; and communicating, by the circuitry on the interface, a response to the read request, the response including the second data element.

In Example 21, the subject matter of any of Examples 14-20, comprising: allocating a second space in memory for a second version of the data object in the second format based on a second base memory address and a second size provided in the allocation request or in a second allocation request; and converting data elements in the first version of the data object to corresponding data elements in the second version of the data object using the conversion function identified in the conversion data structure.

In Example 22, the subject matter of Example 21, wherein providing access to the second format of the data object includes: receiving, on the interface, a read request, the read request including identification of the first data element and specifying a response in the second format; retrieving the second data element from the second version of the data object in the memory based on a mapping in the mapping data structure, the mapping providing a location in memory from the first data element to the second data element; and communicating, by the circuitry on the interface, a response to the read request, the response including the second data element.

In Example 23, the subject matter of any of Examples 14-22, wherein the memory device includes a processor, and wherein the conversion function is software that is executed on the processor.

In Example 24, the subject matter of Example 23, wherein the identification of the conversion function is an address in the memory for code of the conversion function.

In Example 25, the subject matter of any of Examples 23-24, wherein the identification of the conversion function is code of the conversion function.

In Example 26, the subject matter of any of Examples 14-25, wherein the interface conforms to a Compute Express Link (CXL) family of standards.

Example 27 is a machine readable medium including instructions to implement a multi-format data object in memory, the instructions, when executed by processing circuitry of a device, cause the device to perform operations comprising: receiving, at an interface of the device, an allocation request for a data object, the data object including a set of data elements, the allocation request including respective details for a set of formats for the data object, details for a first format in the set of formats including: a base memory address; a size; a mapping between a first data element of the data object in the first format to a second data element in a second format in the set of formats, the first data element and the second data element representing a same data element; and identification of a conversion function configured to convert the first data element to the second data element; allocating a space in memory of the device for a first version of the data object in the first format based on the base memory address and the size in the allocation request; storing the mapping in a mapping data structure corresponding to the data object; storing the identification of the conversion function in a conversion data structure corresponding to the data object; and providing access to the second format of the data object from the first format of the data object in the memory based on the mapping data structure or the conversion data structure, the second format including the second data element.

In Example 28, the subject matter of Example 27, wherein providing access to the second format of the data object includes: receiving, on the interface, a write request for the same data element of the data object, the write request including: an identifier for the first data element; the second data element; and an identification of the second format; and converting, for storage in the memory, the second data element to the first data element using the conversion function in the conversion data structure, the conversion function located based on the identification of the second format and the identifier for the same data element in the write request.

In Example 29, the subject matter of Example 28, wherein the identifier for the first data element includes a memory address for the first data element.

In Example 30, the subject matter of any of Examples 28-29, wherein the identifier for the first data element includes the base memory address for the first format of the data object in the memory and an offset from the base memory address for the first data element.

In Example 31, the subject matter of any of Examples 28-30, wherein a cache coherency data structure for the data object includes an entry corresponding to the first data element, and wherein the entry for the first data element is marked valid following completion of the write request.

In Example 32, the subject matter of Example 31, wherein the entry for the first data element is marked invalid when exclusive access to the first data element is granted to another device.

In Example 33, the subject matter of any of Examples 27-32, wherein providing access to the second format of the data object includes: receiving, on the interface, a read request, the read request including identification of the second data element; converting the first data element from the memory to the second data element using the conversion function identified in the conversion data structure; and communicating, on the interface, a response to the read request, the response including the second data element.

In Example 34, the subject matter of any of Examples 27-33, wherein the operations comprise: allocating a second space in memory for a second version of the data object in the second format based on a second base memory address and a second size provided in the allocation request or in a second allocation request; and converting data elements in the first version of the data object to corresponding data elements in the second version of the data object using the conversion function identified in the conversion data structure.

In Example 35, the subject matter of Example 34, wherein providing access to the second format of the data object includes: receiving, on the interface, a read request, the read request including identification of the first data element and specifying a response in the second format; retrieving the second data element from the second version of the data object in the memory based on a mapping in the mapping data structure, the mapping providing a location in memory from the first data element to the second data element; and communicating, on the interface, a response to the read request, the response including the second data element.

In Example 36, the subject matter of any of Examples 27-35, wherein the processing circuitry is a processor, and wherein the conversion function is software that is executed on the processor.

In Example 37, the subject matter of Example 36, wherein the identification of the conversion function is an address in the memory for code of the conversion function.

In Example 38, the subject matter of any of Examples 36-37, wherein the identification of the conversion function is code of the conversion function.

In Example 39, the subject matter of any of Examples 27-38, wherein the interface conforms to a Compute Express Link (CXL) family of standards.

Example 40 is a system for a multi-format data object in memory, the system comprising: means for receiving, at an interface of a memory device, an allocation request for a data object, the data object including a set of data elements, the allocation request including respective details for a set of formats for the data object, details for a first format in the set of formats including: a base memory address; a size; a mapping between a first data element of the data object in the first format to a second data element in a second format in the set of formats, the first data element and the second data element representing a same data element; and identification of a conversion function configured to convert the first data element to the second data element; means for allocating a space in memory of the memory device for a first version of the data object in the first format based on the base memory address and the size in the allocation request; means for storing the mapping in a mapping data structure corresponding to the data object; means for storing the identification of the conversion function in a conversion data structure corresponding to the data object; and means for providing access to the second format of the data object from the first format of the data object in the memory based on the mapping data structure or the conversion data structure, the second format including the second data element.

In Example 41, the subject matter of Example 40, wherein the means for providing access to the second format of the data object includes: means for receiving, on the interface, a write request for the same data element of the data object, the write request including: an identifier for the first data element; the second data element; and an identification of the second format; and means for converting, for storage in the memory, the second data element to the first data element using the conversion function in the conversion data structure, the conversion function located based on the identification of the second format and the identifier for the same data element in the write request.

In Example 42, the subject matter of Example 41, wherein the identifier for the first data element includes a memory address for the first data element.

In Example 43, the subject matter of any of Examples 41-42, wherein the identifier for the first data element includes the base memory address for the first format of the data object in the memory and an offset from the base memory address for the first data element.

In Example 44, the subject matter of any of Examples 41-43, wherein a cache coherency data structure for the data object includes an entry corresponding to the first data element, and wherein the entry for the first data element is marked valid following completion of the write request.

In Example 45, the subject matter of Example 44, wherein the entry for the first data element is marked invalid when exclusive access to the first data element is granted to another device.

In Example 46, the subject matter of any of Examples 40-45, wherein the means for providing access to the second format of the data object includes: means for receiving, on the interface, a read request, the read request including identification of the second data element; means for converting the first data element from the memory to the second data element using the conversion function identified in the conversion data structure; and means for communicating, on the interface, a response to the read request, the response including the second data element.

In Example 47, the subject matter of any of Examples 40-46, comprising: means for allocating a second space in memory for a second version of the data object in the second format based on a second base memory address and a second size provided in the allocation request or in a second allocation request; and means for converting data elements in the first version of the data object to corresponding data elements in the second version of the data object using the conversion function identified in the conversion data structure.

In Example 48, the subject matter of Example 47, wherein the means for providing access to the second format of the data object includes: means for receiving, on the interface, a read request, the read request including identification of the first data element and specifying a response in the second format; means for retrieving the second data element from the second version of the data object in the memory based on a mapping in the mapping data structure, the mapping providing a location in memory from the first data element to the second data element; and means for communicating, on the interface, a response to the read request, the response including the second data element.

In Example 49, the subject matter of any of Examples 40-48, wherein the memory device includes a processor, and wherein the conversion function is software that is executed on the processor.

In Example 50, the subject matter of Example 49, wherein the identification of the conversion function is an address in the memory for code of the conversion function.

In Example 51, the subject matter of any of Examples 49-50, wherein the identification of the conversion function is code of the conversion function.

In Example 52, the subject matter of any of Examples 40-51, wherein the interface conforms to a Compute Express Link (CXL) family of standards.

Example 53 is at least one machine-readable medium including instructions that, when executed by processing circuitry, cause the processing circuitry to perform operations to implement of any of Examples 1-52.

Example 54 is an apparatus comprising means to implement of any of Examples 1-52.

Example 55 is a system to implement of any of Examples 1-52.

Example 56 is a method to implement of any of Examples 1-52.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A device implementing a multi-format data object in memory, the device comprising:

an interface configured to communicate with an external entity; and processing circuitry configured to:

receive, at the interface, an allocation request for a data object, the data object including a set of data elements, the allocation request including respective details for a set of formats for the data object;

allocate a space in memory managed by the device for a first version of the data object in a first format based on details of the first format in the allocation request;

store a mapping from the details of the first format in a mapping data structure corresponding to the data object;

store an identification of a conversion function from the details of the first format in a conversion data structure corresponding to the data object; and provide access to a second format of the data object from the first format of the data object in the memory based on the mapping data structure or the conversion data structure.

2. The device of claim 1, wherein, to provide access to the second format of the data object, the processing circuitry is configured to:

receive, on the interface, a write request for a same data element of the data object, the write request including:

an identifier for a first data element in the first version of the data object;

a second data element; and an identification of the second format; and convert, for storage in the memory, the second data element to the first data element using the conversion function in the conversion data structure, the conversion function located based on the identification of the second format and the identifier for the same data element in the write request.

3. The device of claim 2, wherein a cache coherency data structure for the data object includes an entry corresponding to the first data element, and wherein the entry for the first data element is marked valid following completion of the write request.

4. The device of claim 3, wherein the entry for the first data element is marked invalid when exclusive access to the first data element is granted to another device.

5. The device of claim 1, wherein, to provide access to the second format of the data object, the processing circuitry is configured to:

receive, on the interface, a read request, the read request including identification of a second data element;

convert a first data element in the first version of the data object from the memory to the second data element using the conversion function identified in the conversion data structure; and communicate, on the interface, a response to the read request, the response including the second data element.

6. The device of claim 1, wherein the processing circuitry is configured to:

allocate a second space in memory for a second version of the data object in the second format based on a second base memory address and a second size provided in the allocation request or in a second allocation request; and convert data elements in the first version of the data object to corresponding data elements in the second version of the data object using the conversion function identified in the conversion data structure.

7. The device of claim 6, wherein, to provide access to the second format of the data object, the processing circuitry is configured to:

receive, on the interface, a read request, the read request including identification of a first data element in the first version of the data object and specifying a response in the second format;

retrieve a second data element from the second version of the data object in the memory based on a mapping in the mapping data structure, the mapping providing a location in memory from the first data element to the second data element; and communicate, on the interface, a response to the read request, the response including the second data element.

8. The device of claim 1, wherein the interface conforms to a Compute Express Link (CXL) family of standards.

9. A method for a multi-format data object in memory, the method comprising:

receiving, at an interface of a memory device, an allocation request for a data object, the data object including a set of data elements, the allocation request including respective details for a set of formats for the data object;

allocating, by circuitry of the memory device, a space in memory of the memory device for a first version of the data object in a first format based on details of the first format in the allocation request;

storing a mapping from the details of the first format in a mapping data structure corresponding to the data object;

storing an identification of a conversion function from the details of the first format in a conversion data structure corresponding to the data object; and providing access to a second format of the data object from the first format of the data object in the memory based on the mapping data structure or the conversion data structure.

10. The method of claim 9, wherein providing access to the second format of the data object includes:

receiving, on the interface, a write request for a same data element of the data object, the write request including:

an identifer for a first data element in the first version of the data object;

a second data element; and an identification of the second format; and converting, by the circuitry for storage in the memory, the second data element to the first data element using the conversion function in the conversion data structure, the conversion function located based on the identification of the second format and the identifier for the same data element in the write request.

11. The method of claim 10, wherein a cache coherency data structure for the data object includes an entry corresponding to the first data element, and wherein the entry for the first data element is marked valid following completion of the write request.

12. The method of claim 11, wherein the entry for the first data element is marked invalid when exclusive access to the first data element is granted to another device.

13. A non-transitory machine readable medium including instructions to implement a multi-format data object in memory, the instructions, when executed by processing circuitry of a device, cause the device to perform operations comprising:

receiving, at an interface of a memory device, an allocation request for a data object, the data object including a set of data elements, the allocation request including respective details for a set of formats for the data object;

allocating, by circuitry of the memory device, a space in memory of the memory device for a first version of the data object in a first format based on details of the first format in the allocation request;

storing a mapping from the details of the first format in a mapping data structure corresponding to the data object;

storing an identification of a conversion function from the details of the first format in a conversion data structure corresponding to the data object; and providing access to a second format of the data object from the first format of the data object in the memory based on the mapping data structure or the conversion data structure.

14. The non-transitory machine readable medium of claim 13, wherein providing access to the second format of the data object includes:

receiving, on the interface, a write request for a same data element of the data object, the write request including:

an identifier for a first data element in the first version of the data object;

a second data element; and an identification of the second format; and converting, by the circuitry for storage in the memory, the second data element to the first data element using the conversion function in the conversion data structure, the conversion function located based on the identification of the second format and the identifier for the same data element in the write request.

15. The non-transitory machine readable medium of claim 14, wherein a cache coherency data structure for the data object includes an entry corresponding to the first data element, and wherein the entry for the first data element is marked valid following completion of the write request.

16. The non-transitory machine readable medium of claim 15, wherein the entry for the first data element is marked invalid when exclusive access to the first data element is granted to another device.

17. The non-transitory machine readable medium of claim 13, wherein providing access to the second format of the data object includes:

receiving, on the interface, a read request, the read request including identification of a second data element;

converting a first data element in the first version of the data object from the memory to the second data element using the conversion function identified in the conversion data structure; and communicating, on the interface, a response to the read request, the response including the second data element.

18. The non-transitory machine readable medium of claim 13, wherein the operations comprise:

allocating a second space in memory for a second version of the data object in the second format based on a second base memory address and a second size provided in the allocation request or in a second allocation request; and converting data elements in the first version of the data object to corresponding data elements in the second version of the data object using the conversion function identified in the conversion data structure.

19. The non-transitory machine readable medium of claim 18, wherein providing access to the second format of the data object includes:

receiving, on the interface, a read request, the read request including identification of a first data element in the first version of the data object and specifying a response in the second format;

retrieving a second data element from the second version of the data object in the memory based on a mapping in the mapping data structure, the mapping providing a location in memory from the first data element to the second data element; and communicating, on the interface, a response to the read request, the response including the second data element.

20. The non-transitory machine readable medium of claim 13, wherein the interface conforms to a Compute Express Link (CXL) family of standards.

* * * * *